US011858477B2

United States Patent
Gaucher et al.

(10) Patent No.: US 11,858,477 B2
(45) Date of Patent: Jan. 2, 2024

(54) COVER FOR WIPER SYSTEM CONNECTION DEVICE

(71) Applicant: Valeo Systèmes d'Essuyage, Le Mesnil Saint Denis (FR)

(72) Inventors: Vincent Gaucher, Le Mesnil Saint Denis (FR); Olivier Jomard, Le Mesnil Saint Denis (FR); Eric Poton, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 0 days.

(21) Appl. No.: 17/802,292

(22) PCT Filed: Feb. 4, 2021

(86) PCT No.: PCT/EP2021/052611
§ 371 (c)(1),
(2) Date: Aug. 25, 2022

(87) PCT Pub. No.: WO2021/170359
PCT Pub. Date: Sep. 2, 2021

(65) Prior Publication Data
US 2023/0147393 A1 May 11, 2023

(30) Foreign Application Priority Data
Feb. 28, 2020 (FR) ...................................... 2002048

(51) Int. Cl.
*B60S 1/40* (2006.01)
(52) U.S. Cl.
CPC .............. *B60S 1/4009* (2013.01); *B60S 1/407* (2013.01); *B60S 2001/4035* (2013.01); *B60S 2001/4061* (2013.01)

(58) Field of Classification Search
CPC .......... B60S 1/407; B60S 1/40; B60S 1/4067; B60S 2001/4067
See application file for complete search history.

(56) References Cited

U.S. PATENT DOCUMENTS

| 7,159,267 | B2 * | 1/2007 | Son | ............................ B60S 1/40 15/250.43 |
| 8,479,350 | B2 * | 7/2013 | Kim | ....................... B60S 1/4003 15/250.32 |

(Continued)

FOREIGN PATENT DOCUMENTS

EP 3228507 A1 10/2017

OTHER PUBLICATIONS

International Search Report and Written Opinion in corresponding International Application No. PCT/EP2021/052611, dated May 30, 2021 (10 pages).

*Primary Examiner* — Michael D Jennings
(74) *Attorney, Agent, or Firm* — Osha Bergman Watanabe & Burton LLP

(57) ABSTRACT

The invention relates to a cover (223) for a connection device designed to be rotatably mounted on an adapter (220) of the connection device, the cover (223) extending mainly between a first end (231) and a second end (232), the first end (231) comprising at least one bearing (235) designed to cooperate with a rod (228) of the adapter (220), the cover (223) being configured to be closed in a first direction of rotation (S1) and to be opened in a second direction of rotation (S2), characterised in that the bearing (235) comprises at least one tab (250) designed to allow the bearing (235) to be disengaged from the rod (228) of the adapter (220), in the first direction of rotation (Si).

9 Claims, 2 Drawing Sheets

(56) References Cited

U.S. PATENT DOCUMENTS

| | | | | |
|---|---|---|---|---|
| 8,615,841 B2* | 12/2013 | Kim | ..................... | B60S 1/4006 15/250.32 |
| 2007/0234501 A1* | 10/2007 | Ho | ....................... | B60S 1/3856 15/250.43 |
| 2010/0205763 A1* | 8/2010 | Ku | ......................... | B60S 1/387 15/250.32 |
| 2013/0167317 A1* | 7/2013 | Oslizlo | ................ | B60S 1/4019 15/250.32 |
| 2014/0259505 A1* | 9/2014 | Fournier | .............. | B60S 1/4009 15/250.32 |
| 2015/0166016 A1* | 6/2015 | Wang | ................... | B60S 1/3858 15/250.32 |
| 2015/0258967 A1* | 9/2015 | Lepper | ................. | B60S 1/4003 15/250.32 |
| 2017/0136995 A1 | 5/2017 | Poton et al. | | |

\* cited by examiner

[Fig. 1]
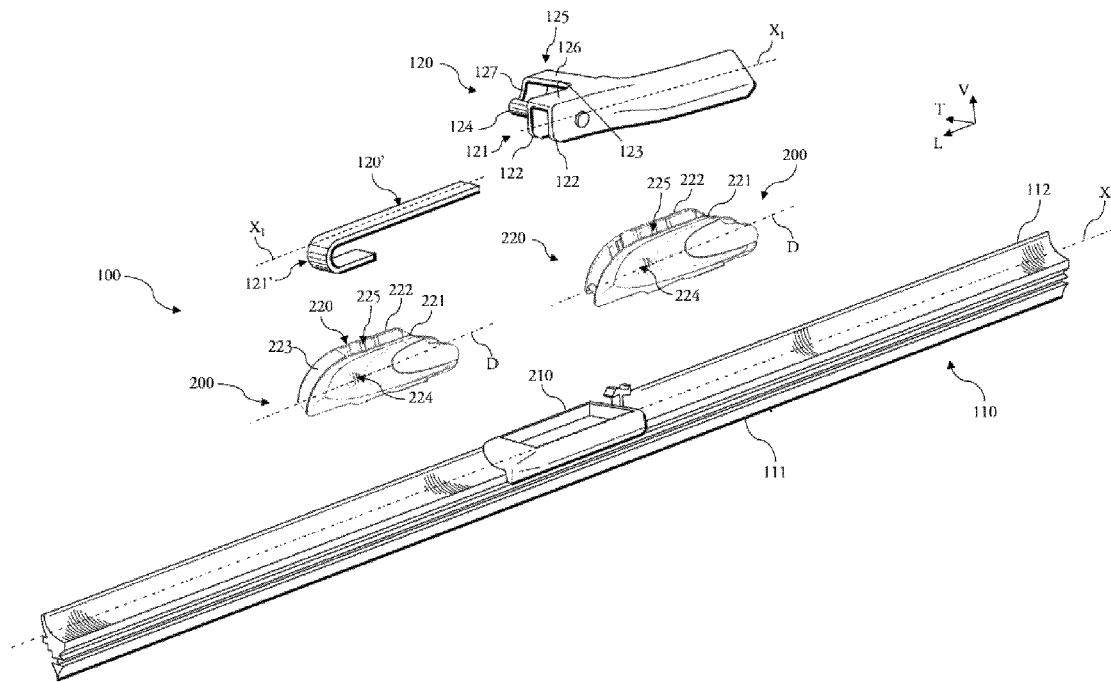
[Fig. 2]
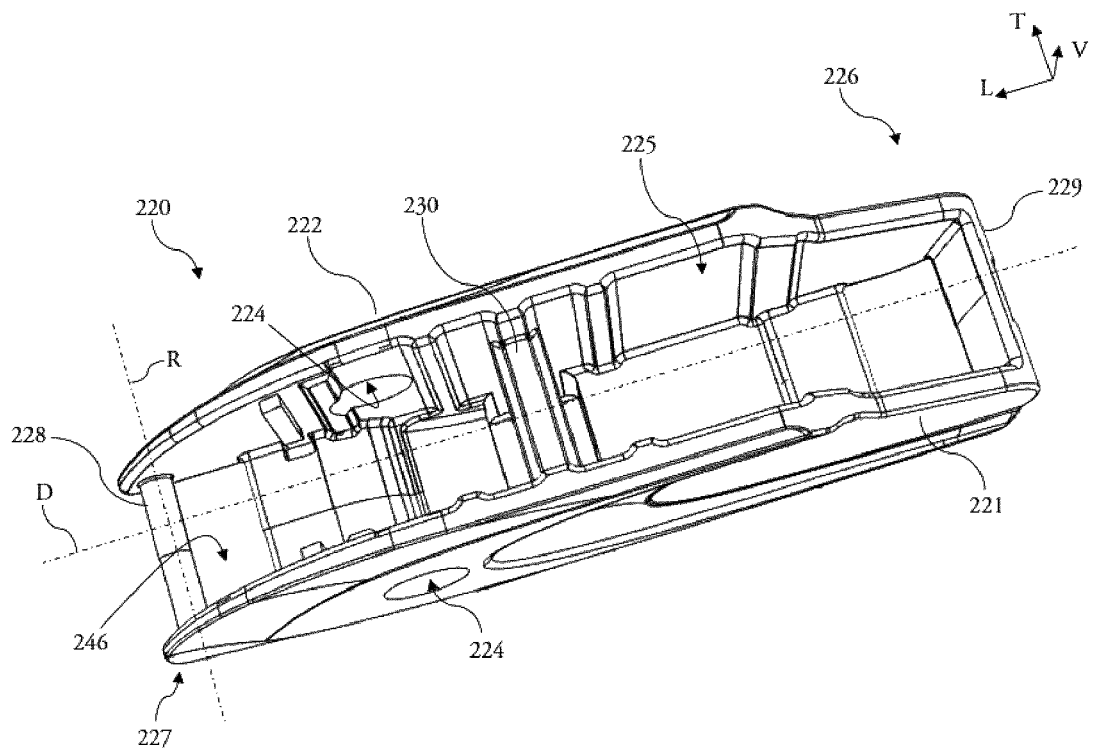

[Fig. 3]
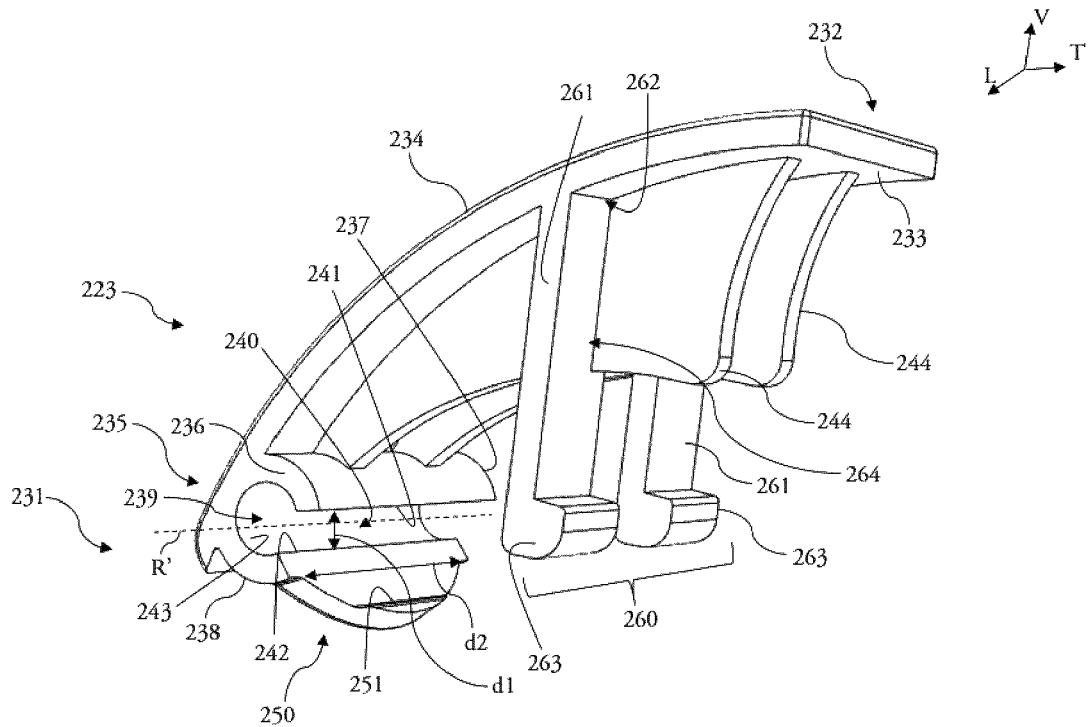
[Fig. 4]
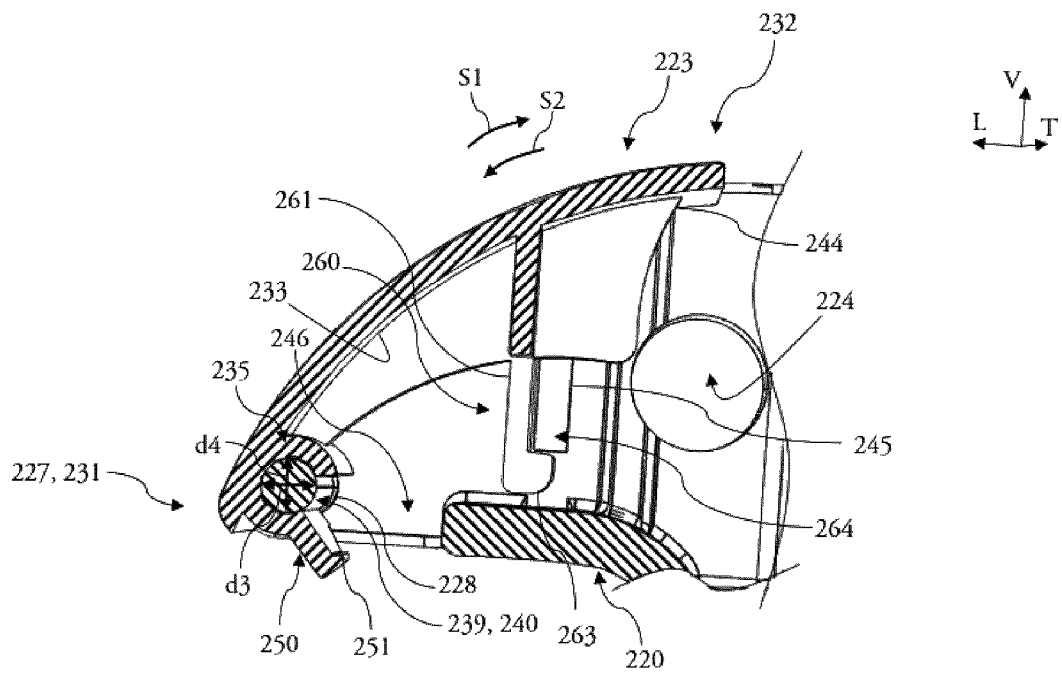

COVER FOR WIPER SYSTEM CONNECTION DEVICE

The field of the present invention is that of wiper systems for motor vehicles. More particularly, the field of the present invention is that of connection means implemented between a wiper arm and a wiper of such a wiper system.

Motor vehicles are commonly provided with wiper systems for cleaning the glazed surfaces, and in particular the windshields, thereof. Such wiper systems comprise at least one wiper arm and a wiper driven by the wiper arm. The wiper arm is thus connected to an electric motor of the vehicle and the wiper comprises at least one wiper blade suitable for coming into contact with the glazed surface to be cleaned. A connection device is arranged between the wiper and the wiper arm so that it can drive the wiper. Such a connection device conventionally comprises at least one connector attached to the wiper and at least one adapter connecting the connector, and therefore the wiper to which it is fastened, to the wiper arm.

There are currently a multitude of different wiper arms that require as many different connection devices for fastening them to the wiper. "Universal" connection devices are currently sold, suitable for use on most of said wiper arms.

A first drawback of said "universal" connection devices lies in the fact that once mounted, the wiper arm received in the adapter of such a connection device remains visible, as does the connector with which the adapter interacts, as well as the different structural elements forming the connection device. It was therefore proposed to add a cover, rotatably mounted on the adapter and, when in the closed position, concealing all of these elements, thus improving the aesthetics of the mounted connection device. This cover further makes it possible to secure the connection between the wiper arm and the adapter. However, said securing function is only possible for a particular type of arm, generally known as a "hook arm". When the connection device as mentioned above is used with a wiper arm known as a "pin arm", said cover interferes with the wiper arm, so that said cover must be removed to allow the use of the connecting arm with said "pin arms".

In the connection devices currently implemented, removing said cover is complex. The present invention falls within this context, and proposes a cover for a wiper system connection device that is easy to disengage relative to the adapter of said connection device.

One object of the present invention thus relates to a cover for a connection device suitable for being rotatably mounted on an adapter of the connection device, the cover mainly extending between a first end and a second end, the first end comprising at least one bearing suitable for interacting with a rod of the adapter, the cover being configured to be closed in a first rotation direction and opened in a second rotation direction. According to the invention, the bearing comprises at least one tab suitable for allowing the disengagement of the bearing relative to the rod of the adapter, in the first rotation direction.

According to the invention, the tab extends towards the outside of the cover. It will be understood that, in order to allow the disengagement of the cover relative to the adapter on which it is rotatably mounted, it must be accessible to the users of the cover according to the invention.

According to one feature of the invention, the bearing is in the shape of a hollow cylinder extending along a main axis of extension between a first base and a second base and comprising a peripheral wall that defines a hollow space, an axial opening being made in the peripheral wall, said axial opening extending from the first base to the second base and said axial opening being suitable for receiving the at least one rod of the adapter. In other words, it will be understood that the peripheral wall has a C-shaped profile, the ends of this C shape defining the axial opening made in the peripheral wall. According to this feature, the peripheral wall thus forms a first edge and a second edge that are spaced apart from each other and define the axial opening made in said peripheral wall, the at least one tab emerging from the second edge. Optionally, the peripheral wall can be made from an elastic material, that is, a material capable of returning to its initial shape after it has been subjected to mechanical stress, so that the rod of the adapter can be forced into the hollow space of the bearing through the axial opening made in said peripheral wall and said peripheral wall will then return to its initial position, thus retaining the rod in the hollow space of the bearing.

According to one exemplary embodiment of the present invention, the tab is in the shape of a semi-circle a diameter of which is smaller than or equal to a length of the bearing measured between the first base and the second base of the hollow cylinder shape, parallel to the main axis of extension of said cylinder. According to this exemplary embodiment, the tab extends predominantly in a main plane of extension, the tab comprising at least one finger extending predominantly according to an axis transverse to the main plane of extension of the tab. Optionally, the finger of the tab can extend predominantly along an axis perpendicular to the main plane of extension of the tab. According to the invention, the cover comprises at least one retaining means suitable for interacting with the adapter, said at least one retaining means being separate from the bearing. According to the invention, said at least one retaining means can for example comprise a branch emerging from an inner face of the cover and extending to a button, the branch, the inner face of the cover and the button defining a zone for receiving a rib formed on the adapter.

Advantageously, the at least one finger forms a gripping region on which the user can exert pressure. Exerting said pressure on the finger of the tab causes a rotational movement of the cover in the first rotation direction, that is, the rotation direction that allows the closing of the cover. As the cover in the closed position is held on the adapter by the at least one retaining means, exerting pressure on the finger ultimately results in the disengagement of the cover, and more particularly of the bearing of said cover, relative to the adapter.

The present invention also relates to a connection device suitable for connecting a wiper arm to a wiper, the connection device comprising at least one connector attached to the wiper arm, at least one adapter suitable for connecting the connector to the wiper arm and at least one cover as mentioned above, the cover being rotatably mounted on the adapter. According to the invention, the adapter comprises at least one rod received in the bearing of the cover, the adapter having an aperture facing said rod and the tab of the cover extending at least partially through said aperture.

The invention also relates to a wiper system comprising at least one wiper suitable for being rotated by a wiper arm, the wiper arm and the wiper being connected to each other by a connection device as mentioned above.

Lastly, the invention relates to a motor vehicle, comprising at least one wiper system according to the invention.

Further details, features and advantages will become more clearly apparent from reading the detailed description given below and with reference to the various embodiments illustrated, by way of example, in the following figures:

FIG. 1 is an exploded diagrammatic view of a wiper system according to two embodiments of the invention;

FIG. 2 is a perspective top view of an adapter of a connection device of the wiper system according to a first embodiment of the invention, suitable for interacting with a wiper arm according to a first exemplary embodiment;

FIG. 3 is a perspective view of a cover suitable for being rotatably mounted on the adapter illustrated in FIG. 2;

FIG. 4 is a longitudinal cross-sectional view of a longitudinal end of the adapter at which the cover is mounted on said adapter.

The features, variants and different embodiments of the invention can be combined with each other, in various combinations, provided that they are not incompatible or mutually exclusive. In particular, variants of the invention can be envisaged that comprise only a selection of the features described below in isolation from the other features described, if this selection of features is sufficient to provide a technical advantage or to distinguish the invention from the prior art.

In the figures, the terms longitudinal, transverse, lateral, left, right, above and below refer to the orientation, with reference to a trihedron L, V, T, of a wiper 1 of a wiper system 100 according to the invention. Within this frame of reference, a longitudinal axis L represents a longitudinal direction, a transverse axis T represents a transverse direction, and a vertical axis V represents a vertical direction of the object in question. Within this frame of reference, a transverse cross-section corresponds to a cross-section made in a transverse and vertical plane, that is, in a plane containing the transverse axis T and the vertical axis V of the trihedron. A longitudinal cross-section denotes a cross-section made in a longitudinal and vertical plane, that is, a plane containing the longitudinal axis L and the vertical axis V. In the following description, the terms "wiper arm" and "arm" are used indiscriminately.

FIG. 1 illustrates, in the same figure, a system 100 for wiping a glazed surface of a motor vehicle according to first and second exemplary embodiments of the present invention, the first example being illustrated on the right in FIG. 1 and the second example on the left in FIG. 1. As illustrated, the wiper system 100 according to the invention comprises at least one wiper no extending along a longitudinal straight line X and suitable for being connected to a wiper arm 120, 120' by means of a connection device 200. The wiper 110 more particularly comprises at least one wiper blade in suitable for coming into contact with the glazed surface to be wiped, a member for stiffening the wiper blade 111 (not illustrated) and at least one air deflector 112 suitable for converting pressure applied by an air stream flowing along the glazed surface into a force pressing the wiper no against the glazed surface of the motor vehicle.

The connection device 200 comprises at least one connector 210 attached to the wiper 110 and at least one adapter 220 suitable for connecting the connector 210, and therefore the wiper 110 to which it is attached, to the wiper arm 120, 120'.

The wiper arm 120, 120' is configured to rotate the wiper 110 to which it is coupled. Said wiper arm 120, 120' is thus mechanically connected to an electric motor (not illustrated) arranged on the vehicle and suitable for rotating the wiper arm 120, 120'. The connection device 200 according to the invention is suitable for allowing a connection between the wiper 110 and the wiper arm 120 according to a first exemplary embodiment and between the wiper 110 and the wiper arm 120' according to a second exemplary embodiment. A distinction is thus made between two separate embodiments of the adapter 220 of the connection device 200, selected depending on the type of wiper arm to be connected.

The features common to the first and second exemplary embodiments of the wiper arm 120, 120' and to the first and second embodiments of the adapter 220 will first be described, followed by the features that distinguish said exemplary embodiments and embodiments from each other.

The wiper arm 120, 120' according to any one of the exemplary embodiments illustrated in FIG. 1 thus extends predominantly according to a main axis of extension $X_1$ between a first end (not illustrated) by which it is connected to the electric motor, and a second end 121, 121' by which it is connected to the adapter 220.

The adapter 220 according to any one of the embodiments illustrated extends predominantly in a longitudinal direction D, that is, a direction parallel to the longitudinal axis L of the trihedron illustrated, and comprises at least a first side wall 221 and a second side wall 222 spaced apart from each other and connected to each other by at least one transverse wall, illustrated for example in FIG. 2. In other words, a space 225 is formed between the first side wall 221 and the second side wall 222. As shown, the first side wall 221 is contained in a first vertical and longitudinal plane, that is, a plane containing the longitudinal axis L and the vertical axis V of the trihedron illustrated, and the second side wall 222 is contained in a second vertical and longitudinal plane, separate from the first vertical and longitudinal plane. In other words, it will be understood that the first side wall 221 and the second side wall 222 extend predominantly in two planes parallel to each other. The adapter 220 further comprises at least one through-orifice 224 made in each of its side walls 221, 222. These orifices 224 are suitable for receiving a shaft for the rotation of the wiper arm 120, 120' relative to the adapter 220. In other words, the orifice 224 made in the first side wall 221 and the orifice 224 made in the second side wall 222 are coaxial.

According to the first exemplary embodiment illustrated on the right of the figure, the second end 121 of the wiper arm 120 comprises at least two sides 122 connected to each other by a top wall 123. The wiper arm 120 according to this first exemplary embodiment further comprises at least one shaft 124 emerging from one of the sides 122 of the second end 121 and extending parallel to the transverse axis T of the trihedron illustrated, away from the two sides 122. More particularly, said shaft 124 emerges from an outer face of the side 122 in question, that is, a face of said side 122 facing in the opposite direction to the other side 122 of the second end 121. In addition, it comprises at least one bar 125 comprising at least a first portion 126 emerging both from the outer face of the side 122 that also holds the shaft 124 and from the top wall 123 of the second end 121, and at least a second portion 127 extending transversely to the first portion 126, towards the wiper 110 when the wiper arm 120 is connected to said wiper 110. Said wiper arm 120 is suitable for being detachably connected to the adapter 220 according to the first embodiment of the invention.

The adapter 220 according to the first embodiment of the invention, also illustrated on the right in FIG. 1, comprises all of the features common to the two embodiments described above. According to this first embodiment of the invention, the orifices 224 are suitable for receiving the shaft 124 of the wiper arm 120 according to the first exemplary embodiment, said shaft 124 thus defining the axis of rotation of the wiper arm 120 relative to the wiper 110. The bar 125 is suitable for pressing against an outer face of one of the side walls 221, 222 of the adapter 220, that is, a face of the side wall in question facing in the opposite direction to the other side wall. More particularly, it will be understood that in the mounted position, the outer face of the side 122 of the second end 121 of the wiper arm 120 from which the shaft 124 emerges is arranged against one of the side walls of the adapter 220, in this case against the first side wall 221, the first portion 126 of the bar 125 extends so that it partially covers the space 225 formed between the first side wall 221 and the second side wall 222, and the second portion 127 of the bar 125 is arranged facing the outer face of the other side wall, in this case of the second side wall 222. For example, the second portion 127 of the bar 125 can be arranged in contact with said outer face of the second side wall 222, thus making it possible to stabilize the connection between the wiper arm 120 according to the first exemplary embodiment and the adapter according to the first embodiment of the invention.

The wiper arm 120' according to the second exemplary embodiment, illustrated on the left in FIG. 1, differs from the wiper arm 120 according to the first exemplary embodiment, in particular in the shape of the second end 121' thereof. The second end 121' of the wiper arm 120' according to the second exemplary embodiment is thus the shape of a hook the curve of which is contained in a longitudinal and vertical plane, that is, a plane containing the longitudinal axis L and the vertical axis V of the trihedron illustrated. Said wiper arm 120' is suitable for being removably connected to the adapter 220 according to the second embodiment of the invention, also illustrated on the left in FIG. 1. More particularly, the hook forming the second end 121' of the wiper arm 120' goes around the transverse wall connecting the first side wall 221 to the second side wall 222 of the adapter 220. In other words, it will be understood that the wiper arm 120' according to the second exemplary embodiment is at least partially received in the space 225 formed between the first and second side walls 221, 222 of the adapter 220.

As will be set out in greater detail below, said adapter 220 according to the second embodiment of the invention differs from the adapter 220 according to the first embodiment in that it comprises a cover 223 arranged at one of its longitudinal ends. This cover 223 is rotatably mounted on the adapter 220 and is suitable for adopting at least a first open position and a second closed position, FIG. 1 illustrating the cover 223 in its closed position. Advantageously, at least one portion of said cover 223, when it is in the closed position, presses against the hook forming the second end 121' of the wiper arm 120' according to the second exemplary embodiment, thus preventing the movement of the wiper arm 120' along the longitudinal axis L and therefore securing the connection between the wiper arm 120' and the adapter 220.

However, as will be set out in greater detail below, said cover 223 cannot be used for the connection between the connection device 200 according to the invention and the wiper arm 120 according to the first exemplary embodiment. Said cover 223 interferes at least with the sides 122 of the wiper arm 120 according to the first exemplary embodiment so that said cover 223 must be disengaged from the adapter 220 in order to allow the wiper arm 120 according to the first exemplary embodiment to be mounted on said adapter 220. To this end, the cover 223 comprises disengagement means described below and illustrated in FIG. 3.

The adapter 220 according to the first embodiment of the invention, that is without the cover and thus suitable for interacting with the wiper arm according to the first exemplary embodiment of the invention, will be described in greater detail with reference to FIG. 2.

The adapter 220 extends predominantly in the longitudinal direction D between a first longitudinal end 226 and a second longitudinal end 227. As mentioned above, the adapter 220 is formed by the first side wall 221 and the second side wall 222, which extend predominantly in two longitudinal and vertical planes parallel to each other. It will be noted that the first longitudinal end 226 is closed by a rear wall 229 of the adapter 220 extending between the first side wall 221 and the second side wall 222, transversely to said first and second side walls 221, 222. More particularly, according to the example illustrated here, said rear wall 229 of the adapter 220 extends predominantly in a transverse and vertical plane, that is, in a plane containing the transverse axis T and the vertical axis V of the trihedron illustrated. In other words, said rear wall 229 of the adapter 220 extends perpendicularly, or substantially perpendicularly, to the first side wall 221 and to the second side wall 222 of the adapter 220. Said rear wall 229 is present on the adapter 220 regardless of the embodiment selected, in other words, whether the adapter 220 is used with the wiper arm according to the first or second exemplary embodiment.

The second longitudinal end 227 of the adapter 220 is partially closed by a rod 228 that connects the first side wall 221 and the second side wall 222 to each other. It will however be noted that an aperture 246 is formed in the adapter, facing said rod 228. According to the example illustrated, said rod 228 more particularly has a cylindrical or substantially cylindrical shape, having a transverse axis of revolution R, that is, said axis of revolution R extends parallel to the transverse axis T of the trihedron illustrated. In other words, the rod 228 extends perpendicularly to the first side wall 221 and to the second side wall 222. Said rod 228 is present on the adapter 220 regardless of the embodiment selected. As described in greater detail below, said rod 228 of the adapter 220 is suitable for being received in a bearing formed on the cover of the adapter when it is used according to the second embodiment.

FIG. 2 also shows the transverse wall 230 mentioned above, which also connects the first side wall 221 to the second side wall 222. According to the example illustrated, said transverse wall 230 extends more particularly parallel to the transverse axis T of the trihedron illustrated and is therefore perpendicular to the first side wall 221 and to the second side wall 222. As described above, said transverse wall 230 is suitable for being received in the hook forming the second end of the wiper arm according to the second exemplary embodiment.

Lastly, FIG. 2 shows the orifices 224 respectively made in each of the side walls 221, 222 of the adapter 220 and suitable for receiving, for example, the shaft of the wiper arm according to the first embodiment.

The cover 223 suitable for being rotatably mounted on the adapter when it is used according to the second embodiment of the invention will now be described in greater detail with reference to FIG. 3. Said cover 223 has a generally curved shape and extends between a first end 231 and a second end 232. Said cover 223 has an inner face 233 facing the space formed between the first side wall and the second side wall of the adapter when the cover 223 is mounted on said adapter, and an outer face 234 facing in the opposite direction to the inner face 233, that is, towards an environment outside the adapter.

As mentioned above, the cover 223 is suitable for being rotatably mounted on the adapter. To this end, the cover 223 comprises a bearing 235 suitable for interacting with the rod formed at the second longitudinal end of the adapter, between the first side wall and the second side wall of said adapter. Said bearing 235 emerges from the inner face 233 of the cover 223 and is in the shape of a hollow cylinder extending along a main axis of extension R' between a first base 236 and a second base 237. In other words, said bearing 235 comprises a cylindrical peripheral wall 238 that defines a hollow space 239. As set out in detail below, said hollow space 239 is suitable for at least partially receiving the rod formed on the adapter. In other words, the hollow space 239 delimited by the peripheral wall 238 of the bearing 235 has dimensions that complement the dimensions of the rod of the adapter. Said bearing 235 also has an axial opening 240 made in the peripheral wall 238, that is, an opening extending between the first base 236 and the second base 237, parallel to the main axis of extension R' of the hollow cylinder shape of the bearing 235. It will therefore be understood that the peripheral wall 238 that defines the hollow space 239 of the bearing 235 has a C-shaped profile, that is, a C shape when viewed in a longitudinal and vertical plane, that is, a plane containing the longitudinal axis L and the vertical axis V of the trihedron illustrated.

The axial opening 240 made in the peripheral wall 238 of the bearing 235 is thus delimited by a first edge 241 and a second edge 242 respectively formed by portions of the peripheral wall 238, in this case by the ends of the C-shaped profile. Said axial opening 240 is configured to allow the insertion of the rod of the adapter into the hollow space 239 of the bearing 235. In other words, a dimension d1 of the axial opening 240 measured perpendicular to the main axis of extension R' of the hollow cylinder between the first edge 241 and the second edge 242 defining said axial opening 240 is greater than or equal to a diameter of the rod of the adapter. Advantageously, the peripheral wall 238 of the bearing 235 can be made from an elastic material, that is, a material configured to return to its initial shape after it has been subjected to mechanical stress, so that it can be deformed to allow the insertion of the rod by force into the hollow space 239 and then return to its initial position in order to hold said rod of the adapter in the hollow space 239 of the bearing 235. In addition, in order to allow the cover 223 to rotate about the rod of the adapter, clearance is provided between the rod of the adapter and an inner face 243 of the peripheral wall 238, that is, a face of said peripheral wall 238 that is facing towards the hollow space 239. In other words, it will be understood that a diameter of the hollow space 239 of the bearing 235 is greater than the diameter of the rod of the adapter. These dimensions are illustrated for example in FIG. 4.

The bearing 235 also comprises a tab 250 extending from the second edge 242 defining the axial opening 240 made in the peripheral wall 238 thereof, towards the outside of the cover 223. Said tab 250 is configured to allow the disengagement of the cover 223 once it is mounted on the adapter. Said tab 250 is more particularly in the shape of a semicircle a diameter d2 of which is less than or equal to a length of the bearing 235, that is, a dimension of said bearing 235 measured along its main axis of extension R' between the first base 236 and the second base 237 of its cylinder shape. The tab 250 also comprises a finger 251 extending in a plane transverse to a main plane of extension of the tab 250, that is, a plane in which said tab 250 predominantly extends. According to a particular example of the invention, the finger 251 can extend along an axis perpendicular to the main plane of extension of the tab 250.

The cover 223 also comprises at least one reinforcing rib 244 emerging from the peripheral wall 238 of the bearing 235 and extending following the curve of the cover 223. According to the example illustrated, the cover 223 more particularly comprises two reinforcing ribs 244 extending predominantly in two parallel planes. Said reinforcing ribs 244 help to maintain the structure of the cover 223 and also form the portion of the cover 223 abutting against the hook of the wiper arm according to the second exemplary embodiment mentioned above.

Lastly, the cover 223 comprises retaining means 260 that help to hold it on the adapter. Said retaining means 260 comprise at least one branch 261 extending in a direction parallel to the vertical axis V of the trihedron illustrated between at least a first end 262 by which it emerges from the inner face 233 of the cover 223 and a second end in the shape of a button 263. As can be seen in FIG. 4 for example, the at least one branch 261, the button 263 forming the second end thereof and the inner face 233 of the cover 223 from which the branch 261 emerges together define a region 264 for receiving a rib formed on one of the side walls of the adapter. In other words, together with the bearing 235, said retaining means help to hold the cover 223 on the adapter 220. According to the example shown, the retaining means 260 are more particularly formed by two branches 261 identical to the branch described above, that is, each of the branches 261 emerges from the inner face 233 of the cover 223 and extends to a second end formed by a button 263, each branch 261 and each button 263 defining, with the inner face 233 of the cover 223, a region 264 for receiving a rib formed on the adapter. In addition, it will be noted that said two branches 261 extend parallel to each other.

FIG. 4 is a longitudinal cross-sectional view of the second end 227 of the adapter 220 on which the cover 223 is mounted. In other words, FIG. 4 illustrates a longitudinal cross-section of the second end 227 of the adapter 220 according to the second embodiment of the invention.

As mentioned above, the cover 223 is rotatably mounted on the rod 228 of the adapter 220 and is configured to adopt at least a closed position, illustrated in FIG. 4, in which it forms a stop against the longitudinal movement of the hook forming the second end of the wiper arm according to the second exemplary embodiment of the invention, and at least an open position in which it permits the insertion of said hook forming the second end of the wiper arm according to the second exemplary embodiment of the invention. The cover 223 can thus be closed in a first rotation direction S1 and opened in a second rotation direction S2 opposite to the first rotation direction S1.

As described above, said rotation is in particular possible because the rod 228 has a diameter d3 smaller than the diameter d4 of the hollow space 239 in which it is received. In addition, FIG. 4 shows one of the ribs 245 formed on the adapter 220, and more particularly on the inner faces of each of the side walls 221, 222 of said adapter 220, received in one of the two receiving regions 264 formed by the retaining means 260.

When the cover 223 is in its closed position, the tab 250 of the cover 223 extends beyond the adapter 220, that is outside said adapter 220. More particularly, said tab 250 extends through the aperture 246 formed in the adapter 220, towards the outside of the cover 223. In particular, at least the finger 251 extends outside the adapter 220 and forms a gripping region, on which a user can exert pressure. It will be understood that applying pressure to said finger 251 of the tab 250 allows the user to disengage the cover 223 from the rod 228. More particularly, the pressure exerted on said finger 251 tends to continue the rotation of the cover 223 in the first rotation direction S1, that is, the rotation direction making it possible to close said cover 223. As the rotation of the cover 223 in this first rotation direction S1 is prevented by the interaction between the ribs 245 and the receiving regions 264 of the retaining means 260, the pressure exerted on the finger forces the cover 223, and more particularly the bearing 235 of said cover 223, to disengage from the rod 228. It is thus particularly easy to remove the cover 223 from the adapter 220, allowing simple, quick adaptation of the connection device 200 according to the invention to different types of wiper arm.

Lastly, FIG. 4 shows the orifices 224 made in the side walls 221, 222 of the adapter 220 and suitable for receiving the shaft of the wiper arm according to the first exemplary embodiment. It can be seen clearly in FIG. 4 that said wiper arm according to the first exemplary embodiment would interfere with the cover 223 so that the cover 223 must be removed to allow the use of the connection device according to the invention with this type of wiper arm.

It will be understood from the above that the cover 223 is removable so as to make it possible to secure the connection between the wiper arm 120' according to the second exemplary embodiment and the adapter 220 according to the second embodiment, and to make it possible to connect the wiper arm 120' according to the second exemplary embodiment to said adapter 220. As has just been described, the present invention allows the simple disengagement of the cover 223 relative to the adapter 220 so that it can easily be used with at least the two types of arm that have just been described.

It will be understood from the above that the present invention thus proposes a connection device for connecting a wiper to a wiper arm that can easily be adapted for use with at least two different types of wiper arm, it being understood that the description that has just been given does not limit the scope of the present invention. The use of the connection device with wiper arms produced according to exemplary embodiments not described herein can in particular be envisaged without departing from the scope of the present invention.

The invention claimed is:

1. A cover for a connection device for being rotatably mounted on an adapter of the connection device, the cover mainly extending between a first end and a second end, the first end comprising:
    at least one bearing for interacting with a rod of the adapter, the cover being configured to be closed in a first rotation direction and to be opened in a second rotation direction,
    wherein the bearing comprises at least one tab for allowing the disengagement of the bearing relative to the rod of the adapter, in the first rotation direction,
    wherein the bearing is in a shape of a hollow cylinder extending along a main axis of extension between a first base and a second base and comprises a peripheral wall that defines a hollow space, and
    wherein an axial opening is made in the peripheral wall, said axial opening extending from the first base to the second base, wherein the axial opening is for receiving the rod of the adapter.

2. The cover as claimed in claim 1, in which the peripheral wall forms a first edge and a second edge that are spaced apart from each other and define the axial opening made in said peripheral wall, the at least one tab emerging from the second edge.

3. The cover as claimed in claim 1, in which the tab is in the shape of a semi-circle a diameter of which is smaller than or equal to a length of the bearing measured between the first base and the second base of the hollow cylinder shape, parallel to the main axis of extension of said cylinder.

4. The cover as claimed in claim 1, in which the tab extends predominantly in a main plane of extension, the tab comprising at least one finger extending predominantly according to an axis transverse to the main plane of extension of the tab.

5. The cover as claimed in claim 1, comprising at least one retaining means for interacting with the adapter, said at least one retaining means being separate from the bearing.

6. The cover as claimed in claim 5, in which the at least one retaining means comprises a branch emerging from an inner face of the cover and extending to a button, the branch, the inner face of the cover and the button defining a zone for receiving a rib formed on the adapter.

7. A connection device for connecting a wiper arm to a wiper, the connection device comprising: at least one connector attached to the wiper arm; at least one adapter for connecting the connector to the wiper arm; and at least one cover as claimed in claim 1, the cover being rotatably mounted on the adapter.

8. The connection device as claimed in claim 7, in which the adapter comprises at least one rod received in the bearing of the cover, the adapter having an aperture facing said rod and the tab of the cover extending at least partially through said aperture.

9. A wiper system comprising at least one wiper for being rotated by a wiper arm, the wiper arm and the wiper being connected to each other by a connection device as claimed in claim 7.

* * * * *